(12) United States Patent
Beekman

(10) Patent No.: US 7,964,850 B2
(45) Date of Patent: Jun. 21, 2011

(54) RADIATION DETECTION APPARATUS

(75) Inventor: Frederik Johannes Beekman, Utrecht (NL)

(73) Assignee: Milabs B.V., Utrecht (NL)

( * ) Notice: Subject to any disclaimer, the term of this patent is extended or adjusted under 35 U.S.C. 154(b) by 467 days.

(21) Appl. No.: 11/988,947

(22) PCT Filed: Jul. 19, 2006

(86) PCT No.: PCT/NL2006/000378
§ 371 (c)(1),
(2), (4) Date: Mar. 20, 2008

(87) PCT Pub. No.: WO2007/011214
PCT Pub. Date: Jan. 25, 2007

(65) Prior Publication Data
US 2009/0266992 A1    Oct. 29, 2009

(30) Foreign Application Priority Data

Jul. 19, 2005  (NL) .................................... 1029558
Feb. 13, 2006  (NL) .................................... 1031136

(51) Int. Cl.
*G01T 1/20* (2006.01)
(52) U.S. Cl. ..................................... 250/368; 250/363.1
(58) Field of Classification Search .................. 250/368, 250/363.1, 227.28, 227.29
See application file for complete search history.

(56) References Cited

U.S. PATENT DOCUMENTS

| | | | | |
|---|---|---|---|---|
| 3,944,835 A | * | 3/1976 | Vosburgh | 250/487.1 |
| 3,997,794 A | * | 12/1976 | York et al. | 378/149 |
| 4,068,126 A | * | 1/1978 | Wilson | 250/363.02 |
| 4,675,526 A | | 6/1987 | Rogers et al. | |
| 4,910,405 A | * | 3/1990 | Suzuki et al. | 250/368 |
| 5,572,034 A | * | 11/1996 | Karellas | 250/368 |
| 6,031,234 A | * | 2/2000 | Albagli et al. | 250/370.11 |

(Continued)

FOREIGN PATENT DOCUMENTS

| | | |
|---|---|---|
| EP | 0 678 757 A1 | 10/1995 |
| JP | 60073439 A  * | 4/1985 |
| WO | WO-2004/029714 A2 | 4/2004 |

OTHER PUBLICATIONS

Freek J. Beekman et al., "Photon-counting versus an integrating CCD-based gamma camera: important consequences for spatial resolution" vol. 50, Jun. 21, 2005, pp. N109-N119.

Ploux L. et al: "In vivo radiolabel quantification in small-animal models—An approach to in vivo high-resolution SPECT imaging in small laboratory animals" vol. 25, No. 8, Nov. 1998 pp. 737-742.

(Continued)

*Primary Examiner* — Constantine Hannaher
(74) *Attorney, Agent, or Firm* — Birch, Stewart, Kolasch & Birch, LLP

(57) ABSTRACT

A scintillation camera includes a scintillation material which is capable of converting high-energy radiation incident thereon and having a wavelength of X-ray radiation or shorter into optical radiation, at least one position-sensitive detector capable of detecting the optical radiation, and at least one bundle of light guides which is located in front of the detector, characterized in that the bundle of light guides is located between the detector and the scintillation material. As a result of the scintillation material being provided as a separate unit, optionally including non-scintillating light guides, selection of the materials of each of the two parts can be optimized. Thus, for example, the scintillation material is no longer hygroscopic or subject to restrictions because of the need to grow it in parallel bundles.

11 Claims, 4 Drawing Sheets

U.S. PATENT DOCUMENTS

| | | | |
|---|---|---|---|
| 6,242,744 B1 | 6/2001 | Soluri et al. | |
| 6,380,541 B1 * | 4/2002 | Laine et al. | 250/368 |
| 6,800,857 B2 * | 10/2004 | Kajiwara et al. | 250/368 |
| 2002/0005488 A1 * | 1/2002 | Hendrix | 250/368 |
| 2004/0227091 A1 * | 11/2004 | LeBlanc et al. | 250/366 |

OTHER PUBLICATIONS

De Vree G. A. et al: "EMCCD-based Photon-counting mini Gamma Camera with a Spatial Resolution < 100 ?m" vol. 5, Oct. 16, 2004, pp. 2724-2728, XP-010819261.

* cited by examiner

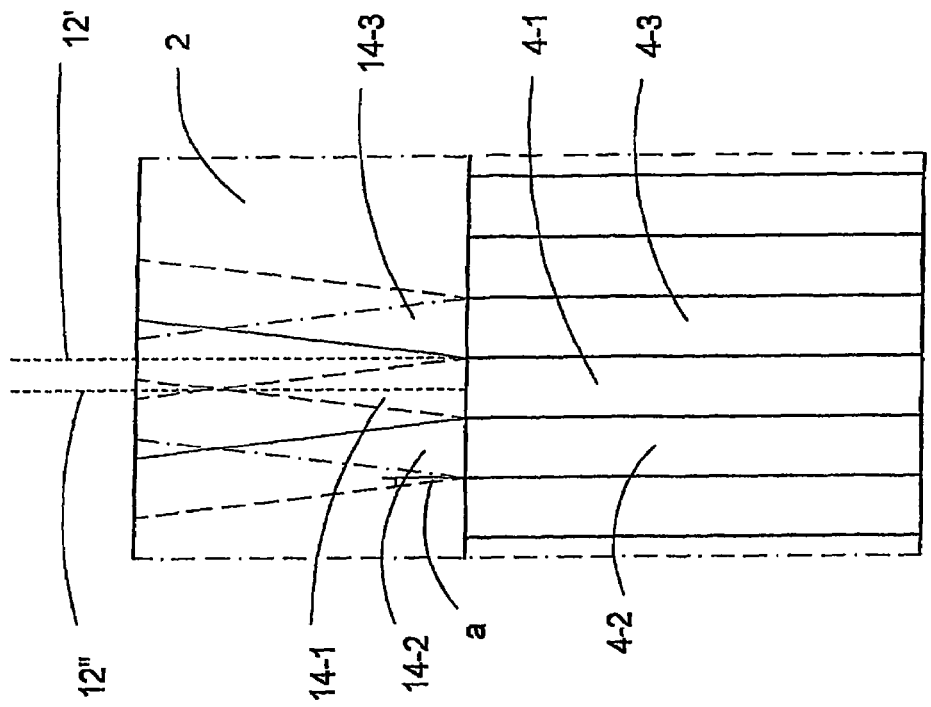
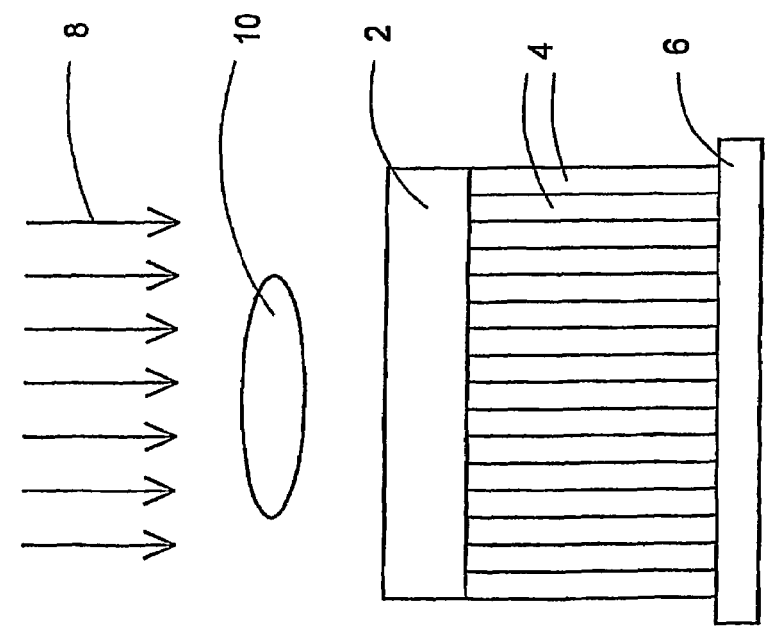

RADIATION DETECTION APPARATUS

FIELD OF THE INVENTION

The present invention relates to a scintillation camera. In particular it relates to a scintillation camera comprising a scintillation material which is capable of converting high-energy radiation incident thereon and having a wavelength of X-ray radiation or shorter into optical radiation, at least one position-sensitive detector capable of detecting the optical radiation, and at least one bundle of light guides which is located in front of the detector.

BACKGROUND OF THE INVENTION

Cameras of this type are known, and they are used, for example, to produce images of objects, animals or humans for the purpose of examining these. For example, the article "Photon-counting versus an integrating CCD-based gamma camera: important consequences for spatial resolution", Phys. Med. Biol. 50 (2005) N109-N119, by Beekman and De Vree, describes a gamma camera comprising a bundle of columnar scintillators which, via a tapered bundle of optical fibres, is coupled to a CCD.

The camera disclosed by the abovementioned document has the drawback that the light guides used are fibres grown from scintillating material and must meet a number of requirements. One of these relates to the circumstance that only a small number of scintillation materials is suitable for being grown as fibres. This restriction in the choice of material manifests itself, inter alia, in drawbacks such as a limited conversion efficiency and the limited maximum length of the fibres, resulting in limited total radiation conversion. Moreover, the materials such as cesium iodide are often hygroscopic, which has an adverse effect on the service life of the fibres. Furthermore, protective measures such as enclosing fibres of this type in glass or the like result in increased cost and complexity.

OBJECT OF THE INVENTION

It is an object of the present invention to provide a scintillation camera in which one or more of these drawbacks are overcome at least in part and which at least provides an alternative thereto.

SUMMARY OF THE INVENTION

This object is achieved by a scintillation camera for examination of an object, said scintillation camera comprising:
  a wall positioned adjacent an object receiving chamber for receiving an object to be examined, said wall being of a material that blocks high-energy radiation having a wavelength of X-ray radiation or shorter, and said wall having an opening through which high-energy radiation from the object receiving space is able to pass,
  a monolithic scintillation crystal having an incident side and an opposed rear side, said monolithic scintillation crystal being positioned on a side of said wall facing away from the object receiving space and positioned such that high-energy radiation passing through said opening in said wall is incident on the incident side of said scintillation crystal, said monolithic scintillation crystal converting said high-energy radiation having a wavelength of X-ray radiation or shorter incident thereon into optical radiation,
  at least one bundle of non-scintillating optical fibres, each of said non-scintillating optical fibres having an end that is joined to said rear side of said monolithic scintillation crystal, wherein all said ends of said optical fibers are aligned so as to each point to said opening in said wall,
  at least one position-sensitive detector that detects the optical radiation emanating from the optical fibres.

A camera is thus provided in which scintillation material and light guides, here embodied as optical fibres, are functionally separated. Separately and optimally selectable scintillation material causes the high-energy radiation to be converted into optical radiation which is subsequently passed to the detector(s) within the likewise optimally selectable light guides. It should be noted at this point that the term light guides refers to optically transparent bodies which channel light by means of total internal reflection, for example glass fibres. Lenses, optical collimators, internally mirrored tubes and the like are not being referred to under this heading.

In the present context, optical radiation should be regarded as comprising visible light, ultraviolet radiation and infrared radiation. This optical radiation will sometimes be referred to as "light", for example in the term light guides. The contrast to the high-energy radiation will be clear at all times. Radiation having a wavelength of less than 1 nm is referred to as high-energy radiation in the present context. Preferably, the radiation comprises X-ray radiation or gamma radiation.

The scintillation material is provided in the form of one crystals or other continuous formations having a cross-sectional area which is at least as large as the cross-sectional area of the light guides, advantageously at least 100 times the cross-sectional area of the light guides, more preferably having a cross-sectional area which is at least half, and most preferably larger than, the cross-sectional area of a bundle of light guides, said last embodiment being intended to prevent any effects caused by the boundary of the scintillator material as a whole. In general it is the case that the larger the cross-sectional area of the units of scintillation material with respect to the light guides, the smaller will be the effect of scattering and reflections in side walls thereof.

In principle, any suitable material is eligible as a scintillation material according to the invention, since, for example, the restriction that it must be capable of being grown to form light guides does not apply. Examples of suitable materials include tungstates such as $CdWO_4$, but many other materials known to those skilled in the art are likewise possible. A major advantage, moreover, is that the fabrication costs are considerably lower than for grown bundles of scintillating light guides, and that they can be replaced in a simple manner. Moreover, it is possible to select materials having a high density and high conversion efficiency such as the abovementioned $CdWO_4$. It should be noted here that it is still possible for the scintillation material to have been grown on the light guides. This can still be of advantage in connection with e.g. beneficial optical material junctions.

The light guides are fabricated from a substantially non-scintillating optical material. While it is certainly possible to use scintillating material for the light guides, there are advantages in employing non-scintillating material. Thus there is greater freedom of choice, and it can be optimally tailored to the light-guiding function, for example by using quartz or suitable plastics, which guide optical radiation very well. In addition, the processability, flexibility, durability etc. of materials of this type is often much better than that of scintillating materials.

In the camera the light guides is are provided in the form of optical fibres.

In the camera the light guides is are provided in the form of optical fibres. Optical fibres are light guides often, but not necessarily, having a large ratio between length and cross section. Furthermore, the cross section thereof is often round, but it can also be elliptical, angular and the like. Furthermore, it is possible to allow the cross section to vary over the length of the fibre, for example to let it taper, or even to have a plurality of fibres merge together, in order thus to obtain specific desired optical characteristics. Some often used types of optical fibres are quartz fibres, glass fibres and plastic fibres, for example made of PMMA etc.

As already described hereinabove, the light guides carry the light emitted by the scintillation material, or on occasion by themselves, via their optical bodies to the detector associated therewith. In the process, the light retains its positional information, because the light remains captive in the respective light guide by virtue of the principle of complete internal reflection.

This is true, at least, for light incident into the light guide at an angle relative to the optical axis which is smaller than a critical angle typical for said light guide.

One measure of the critical angle is the numerical aperture (NA) of said light guide. Light incident into the light guide at a larger angle will be able to escape said light guide. This light could then reach an adjacent light guide, and the positional information would thus be lost or at least be more difficult to derive. It is therefore possible, and it may be preferable, to provide the light guides with an absorbing sheath, for example a blackened plastic sheath. An absorbing layer of this type has a beneficial effect on the signal-to-noise ratio of light on the detector, which in turn has a positive effect on the resolving power of the camera as a whole.

Each light guide will be able to collect light from roughly a (truncated) cone of directions hereinafter also referred to as collection cone, and carry it to the detector. Depending on the NA, said cone will be wider or narrower. Thus, these cones will overlap more and more at increasingly larger distances of the incidence planes of the light guides. As the overlap increases, light emitted by virtue of scintillation will be able to end up in increasingly large numbers of light guides, with a concomitant decrease in resolving power. Those skilled in the art will therefore seek to strike a balance between the thickness of the scintillation material, where a thicker layer means greater conversion, the cross section of the light guides, where a larger cross section means more favourable light transport, and the NA of the light guides, where a higher NA means more light collected. The values will be chosen by those skilled in the art so as to ensure that the desired resolving power is achieved, or alternatively that the highest resolving power possible is achieved.

In a preferred embodiment, the light guides have a numerical aperture of at most 0.5, preferably at most 0.3 and more preferably at most 0.2. In many cases, a useful resolving power is found to be achievable for such values of the NA, without unduly reducing the luminous intensity. For example, single-mode light guides exist, having a very small cross section of a few μm. In such a case, thousands of light guides can be available for each crystal. Obviously, other light guides are also possible, for example thicker ones.

Alternatively there is also found to be possible, in contrast, to employ a very high NA for the light guides. Owing to a variety of optical effects, an adequate directional effect will still occur in many cases, thus achieving satisfactory resolving power. This is partly connected to the fact that the total collected intensity can increase. In this embodiment, the numerical aperture of the light guides is at least 0.5, in particular at least 0.8, more particularly about 1.

Advantageously, the scintillation material on the side facing away from the detector is provided with an antireflective layer which is substantially transparent to the high-energy radiation but which prevents the optical radiation from being reflected back into the scintillation material. An antireflective layer of this type prevents optical radiation propagating in the directions facing away from the detector from being reflected at that interface of the scintillation material which faces away from the detector, and thus from forming a false, i.e. shifted, signal for the detector. The signal-to-noise ratio of the optical radiation at the detector can thus be increased. In particular, the light relevant for the resolving power, i.e. the light generated by scintillation, will pass into the light guides directly, without detours, whereas light which cannot enter said light guides in one go, but only after a detour such as reflection, for example at the interface of the scintillation material, cannot generate any additional interfering signal in the detector. In other words, interfering background noise is reduced.

In principle, the antireflective layer can be a coating which reduces reflections at the interface with the surrounding medium, thus promoting the escape of the optical radiation from the scintillation material similar to the blooming of glass of lenses and the like. Preferably, however, the antireflective layer relates to a layer which absorbs the optical radiation, such as a sufficiently thin blackened layer.

In another preferred embodiment, the scintillation material on the side facing away from the detector is provided with a retroreflective material. A material of this type can cause the optical radiation incident thereon to be reflected parallel to the incident direction. The luminous intensity incident onto the light guides can thus be increased. The material should obviously exhibit good transmission of the high-energy radiation and is usually provided in a thin layer. An example of such a retroreflective material is 3M Scotchlite™ sheeting.

The scintillation camera according to the invention further comprises a space for mounting an object to be examined, the scintillation material and the light guides being located between the space and the detector. By virtue of such a space to be provided already with the camera, it can be optimally tailored thereto, for example in terms of the spacing and alignment of the detectors. Such a space can comprise, for example, a space for an animal such as a laboratory mouse or alternatively some other type of sample space. Scintillation cameras of this type are sometimes referred to as transmission scintillation cameras. In contrast, emission scintillation cameras are more like ordinary photographic cameras in terms of design and operation and usually do not comprise such a space.

In a special embodiment, the scintillation camera according to the invention further comprises a source of high-energy radiation. Here too it is the case that providing such a radiation source already with the camera has the advantage that the other components can be optimally tailored thereto. The source of high-energy radiation may comprise, for example, an X-ray tube, a radioactive isotope or an object or experimental animal treated with such an isotope.

In a specific embodiment, the high-energy radiation is substantially parallel. This provides the option, in a fairly simple manner, of performing absorption measurements on the object or experimental animal to be studied. To this end, the source can be a sufficiently intense source positioned at a sufficient distance to thus achieve the desired degree of parallelity. Alternatively, use can be made of a collimator to form emitted radiation into e.g. a parallel beam, by at any rate only transmitting radiation which runs parallel to channels through the collimator. The output side of such a collimator can be regarded as a "source" of parallel radiation. In addition, the collimator can have an optical mode of operation other than selecting parallel radiation. For example, a collimator can also have a fan- or cone-shaped divergent or convergent mode of operation or be astigmatic etc.

In an advantageous embodiment, at least some and preferably all of the light guides are arranged to be substantially parallel. By means of such an arrangement of the light guides, positional information regarding the incident radiation is provided in the simplest manner. One possible option here is a direct link between light guides and detector, said detector in many cases consisting of a plurality of, and often very many, subdetectors. Examples include CCDs, CMOS devices and photomultiplier arrays. For example, a subdetector, or a small number of these, will then each be associated with a light guide, or vice versa. Nevertheless it is possible to provide the light guides in some other arrangement, as long as the coupling between the incident location in the light guide (bundle) and the detection point can be established.

In a specific embodiment, the source comprises at least one point source. A non-limiting example thereof is a small quantity of radioisotope or an X-ray source having small dimensions relative to the other components of the camera, although they will of course have some physical extent.

The scintillation camera comprises a wall of a material blocking the high-energy radiation, said wall having at least one opening. This relates, inter alia, to the so-called pinhole cameras which are able to form an image of an extended source having spatially distributed radiation/activity, since this is incapable or virtually incapable of being controlled "optically" by means of lenses or the like. The pinhole, or opening in the wall, can thus be regarded as a source, a virtual source. This is then located between the object to be examined and the scintillation detector (material, light guide plus detector) and emits in a series of transmission directions. These directions are determined by the precise shape of the opening and the slope of its walls. The high-energy radiation transmitted through the pinhole does then contain spatial information concerning the isotropic distribution in the object.

In a specific embodiment, the wall comprises a collimator having a plurality of openings, the openings being channels having a length which is at least five times the size of a cross section thereof, each channel defining a transmission direction in which high-energy radiation is able to propagate, at least two transmission directions forming an angle not equal to zero. This can therefore be regarded as a collection of virtual sources each emitting in their own transmission direction. Strictly speaking this, incidentally, is a more or less narrow cone around the transmission direction, but in a practical collimator the width of this cone is negligibly small. Collimators are much used, e.g. in radionuclide-imaging techniques, to define the direction of the high-energy radiation. For one explanation of this and for a number of examples such as divergent and convergent collimators see chapter 13 from "Physics in Nuclear Medicine" by Cherry et al., especially subparagraph B, 3. It is noted here that parallel collimators also exist, which have already been mentioned and dealt with in the embodiments involving parallel high-energy radiation.

In all the embodiments mentioned up to now, it is possible to provide the light guides as one or more bundles substantially parallel to one another. Especially if the layer of scintillation material is sufficiently small in relation to the other dimensions in the camera, such an arrangement will be able to detect at adequate positional resolution. Given thicker layers, which may be advantageous in terms of higher radiation conversion, other arrangements may be advantageous. In a specific embodiment, at least some of the light guides, by their ends facing away from the detector, form an acute angle. In particular, the light guides are bundled in a fan-shaped manner in at least one and preferably two dimensions. Advantageously, all the light guides in a bundle are directed towards one point. This is the case, at any rate, if that end face of the light guides which faces said point is at the same time perpendicular to the optical axis of the light guide at the location of the end face. If said end face is at an angle other than a right angle with respect to the optical axis, the alignment should be corrected for refraction of the optical radiation at the interface with the scintillation material and at the abovementioned end face of the light guide. Such an alignment may occur, for example, if the end faces of the light guides in a bundle are jointly ground flat or the like. Additionally it should be noted here that such a correction of the alignment is not necessary if the refractive index, for the optical radiation, of the scintillation material and the light guides are all but matched, and the two components are optically joined. Advantageously, the scintillation material and the material of the light guides are matched to one another according to this criterion.

Thus, a specific scintillation camera according to the invention is characterized in that each of the light guides has a collection cone of directions in the scintillation material from where optical radiation coming into said light guide is passed on by virtue of total internal reflection, wherein it is the case, for at least two light guides and preferably all the light guides, that they are each arranged in such a way that a centre line of their respective collection cone forms a smaller angle with the transmission direction running closest to said centre line at the location of an end face facing away from the detector, of said light guide than a corresponding angle between said transmission direction and the respective centre line in the case of a configuration in which the collection cones of all the light guides are parallel to one another.

What is meant here is this: the collection cone of a light guide specifies which optical radiation generated by scintillation can be collected in the light guide. If a high-energy ray propagating in a transmission direction intersects many different collection cones, it will be the case that said high-energy ray will also be able to generate optical radiation within said many collection cones, by means of scintillation at various depths within the scintillation material. Thus it is possible for the well-known depth-of-interaction problem to occur, where information concerning the position/direction of origin of the high-energy ray is lost. The image then becomes blurred.

If the light guides, and therefore their collection cones, are then aligned in such a way that fewer collection cones are intersected by the high-energy rays, the optical radiation will likewise be collected by fewer cones. To this end, the angle between the collection cones and the high-energy ray in question, or the transmission direction, can be reduced compared with the case of a bundle of parallel light guides. In other words, the light guides and their collection cones are tilted in such a way that they are more parallel to said transmission direction. This will ensure, as far as possible, that optical radiation generated by high-energy rays incident onto the scintillation material at one and the same point and at a specific angle will each remain in one and the same collection cone or at least in the fewest possible different collection cones and in any case fewer than for a parallel arrangement. As a result, the optical radiation produced is collected by one and the same light guide or by the fewest possible light guides, respectively.

In yet other words, each light guide is looking, in terms of optical radiation, in one direction of high-energy radiation. As a result, optical radiation generated by a high-energy ray coming from that direction will mostly be collected by that particular light guide. Other light guides will not be able to collect that light, or at least those light guides whose collection cone does not overlap the collection cone of the first mentioned light guide. The overlap of collection cones is thus minimized and the resolving power is increased. Obviously, the previously mentioned advantages of specific embodiments will again apply, for example light guides having a small NA etc.

It should be noted that if a plurality of transmission directions in fact representing concrete lines instead of just one direction in the space are equally close to a certain centre line, an arbitrary choice amongst these transmission directions can be made.

The abovementioned functional description, whose degrees of freedom inter alia include the alignment of the axis of the light guides at least close to the scintillation material, the position of the end face of the light guides with respect to both the axis of the light guide and the scintillation material, and within certain limits the refractive indices of the scintillation material and the material of the light guides, provides those skilled in the art a recipe to calculate the desired alignment by means of elementary optics (Snell's law of refraction) to obtain a useful resolving power of the camera.

A particular embodiment is characterized in that it is the case for at least two light guides, preferably all the light guides in one dimension of the bundle of light guides and most preferably in all the dimensions of the bundle of light guides, that the centre line of their respective collection cone runs substantially parallel to the transmission direction closest to said centre line at the location of an end face facing away from the detector, of said light guide.

It should be noted that a normal, cylindrical light guide has a normal, "neat" collection cone. If, owing to particular end face and/or light guide geometries the collection cone does not have a neat conical shape, it is still preferable for the centre line of said collection cone to be used as a guideline, i.e. the line corresponding with the direction of light which, having entered the light guide, propagates centrally through said light guide and parallel to its walls. After all, the major fraction of the radiation is emitted approximately, i.e. within a small angular error range, along said line.

In a specific preferred embodiment, the scintillation camera comprises a plurality of detectors and a plurality of bundles of light guides, each bundle being associated with one of the plurality of detectors. As a matter of fact, a system is thus obtained which is capable of producing different views of an object or experimental animal to be examined, for example from various viewing angles. On the other hand it is also possible to provide a number of detectors and/or bundles of light guides in a parallel arrangement, resulting in a larger detector.

The invention as described hereinabove will now be explained in more detail with reference to non-limiting exemplary embodiments, reference being made to the appended drawings, in which.

BRIEF DESCRIPTION OF THE DRAWINGS

FIG. 1 shows a schematic first embodiment of a scintillation camera, in operation;

FIG. 2 shows a detail of the camera of FIG. 1 with a beam path therein;

DETAILED DESCRIPTION OF THE INVENTION

Figure 3:
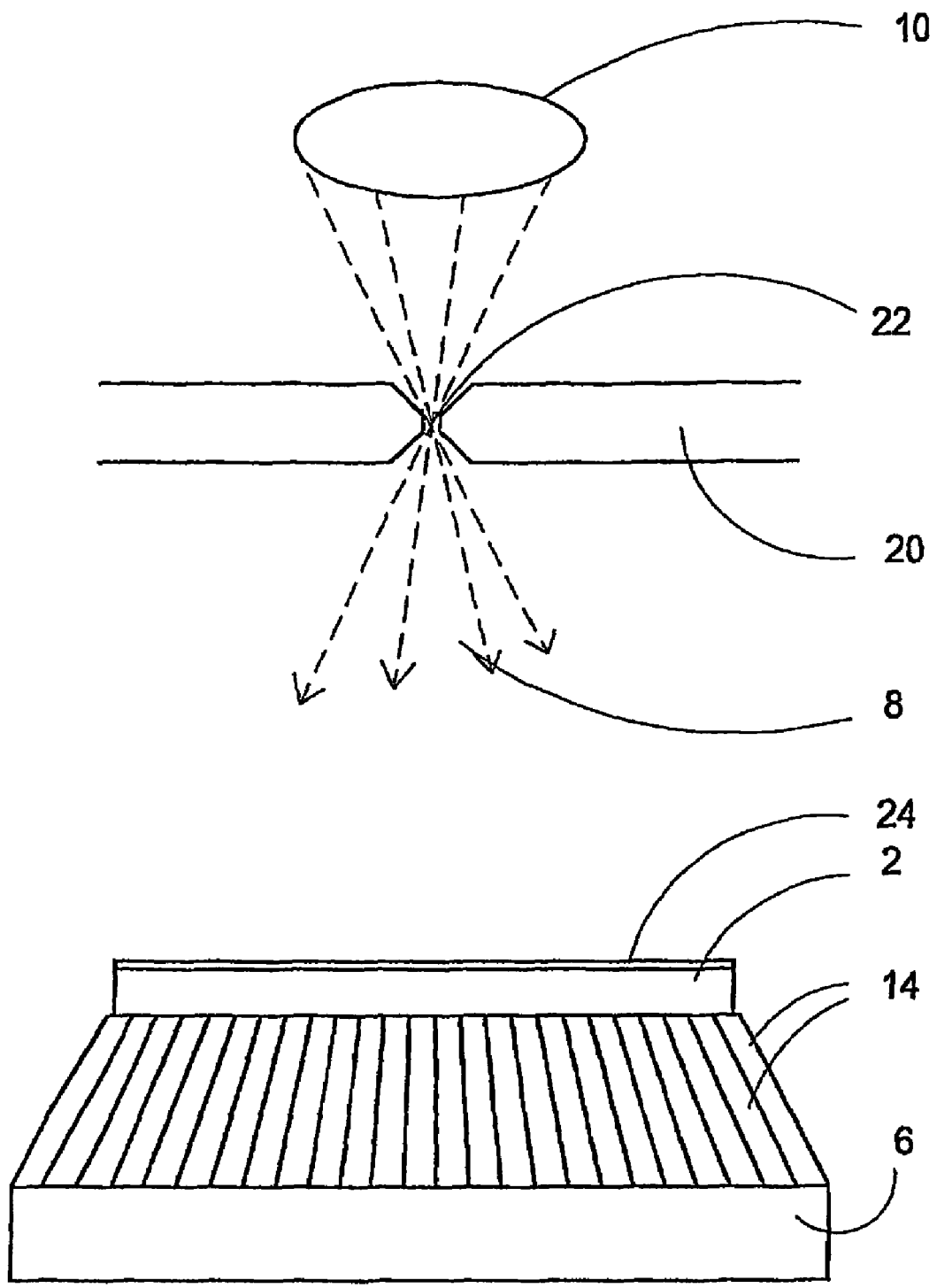
FIG. 3 shows a schematic second embodiment of a scintillation camera, in operation.

In FIG. 1, 2 is a scintillation crystal, 4 indicates a bundle of light guides, and 6 is a detector. A beam of high-energy radiation is indicated by 8, while 10 designates an object, experimental animal or human to be examined, hereinafter usually indicated as "object" for the sake of brevity. It should be noted that FIG. 1, and the others in this drawing are schematic and not necessarily to scale.

The camera shown is of the transmissive type, in which usually parallel radiation from a separate source passes through the object and subsequently impinges on the detector. In the camera shown, a beam of high-energy radiation, for example X-ray or gamma radiation is supplied, parallel in this case, to an object 10 to be examined, for example a laboratory mouse. Having passed through the object, the unabsorbed fraction of the radiation will hit a scintillation crystal in which the radiation incident thereon is (partially) converted into optical radiation which is carried via the bundle of light guides 4 to a detector 6 which is sensitive to that optical radiation.

The scintillation crystal 2 in this case is a homogenous unit of an iodide, a tungstate, a plastic or the like. Here the shape is that of a block, with top and bottom faces parallel, so as to provide constant thickness.

The bundle of light guides 4 is shown as a parallel bundle of guides of equal thickness, such as optical fibres of, for example, glass.

The alignment of the light guides 4 is drawn as being parallel to the beam 8. The positional information is obtained by virtue of optical radiation which enters a light guide 4 remaining captive therein and propagating in a parallel manner until it is fed to the detector 6. If the detector 6 is capable of position-sensitive measurements, as is the case, for example, for a CCD or CMOS device or an arrangement of photomultiplier tubes, the detection as a whole is position-sensitive. An apparatus of this type can have a number of pixels or subdetectors which matches the desired resolving power. Similar considerations obviously also apply to the number of light guides 4 in the bundle but these details will not be addressed further hereinafter.

FIG. 2 shows a detail of the camera of FIG. 1, with a beam path therein.

Here, 4-1, 4-2 and 4-3 are a first, second and third light guide, respectively, and 14-1, 14-2 and 14-3 are the corresponding first, second and third collection cones of directions from where optical radiation can be collected, each having an apex angle a. A first and a second gamma ray are indicated by 12' and 12" respectively.

The collection cones 14-1 etc. can be determined in a simple manner on the basis of the numerical aperture (NA) of the light guides 4, according to NA=sine (apex half-angle of the collection cone). Therefore a light guide having an NA of 0.1, such as a single-mode optical fibre, has an apex half-angle of the collection cone of a mere 5.7°, whereas a light guide having an NA of 0.8 has an apex half-angle of 53° which therefore will have far greater overlap but on the other hand will collect more light. The desired NA depends, inter alia, on the thickness of the scintillator layer 2 and the desired resolving power. For a thickness of 1 mm and a resolving power at that face of the scintillator layer which faces away from the detector of 250 μm, the required half-NA=(0.25 mm/2)/1 mm=0.125, which does not constitute a problem. For that matter, overlap will still be able to occur, but image processing employing weighting can correct a great deal. Moreover, it is possible to opt for making the spacing between the separate light guides sufficiently large for there to be just about no overlap, everything being in geometric proportion to the thickness of the scintillator material.

It can be seen that the first gamma ray 12' comes in into the collection cones 14-1 and 14-3. This means that optical radiation generated as the ray 12' passes through the scintillation material 2, will arrive in part in the third light guide 4-3 and in part in the first light guide 4-1, in this case, as seen statistically, in equal proportions in both. This means in turn that the corresponding gamma flash has a width of precisely two light guides. This in turn implies that the flash must have occurred at the interface of the two light guides 4-1 and 4-3. It should be noted here that the gamma flash in question will of course radiate in all directions, but only that radiation which falls within a collection cone will be capable of being picked up and carried within a light guide. The remaining radiation will be lost.

It can also be seen that the second gamma ray 12" predominantly comes in into the collection cone 14-1 of light guide 4-1. Only a small fraction of the optical radiation generated thereby falls outside, in collection cones 14-2 and 14-3. Thus the detector (not shown here) will be capable of clearly locating this gamma flash at light guide 14-1, possibly on the basis of weighting the intensity of the signals from light guides 14-1, 14-2 and 14-3.

FIG. 3 shows a schematic second embodiment of a scintillation camera, in operation. Here, as in the other figures of the drawings, similar elements are indicated by corresponding reference numerals.

The camera as shown here is sometimes referred to as a pinhole camera. Again, it comprises a scintillation crystal 2 and a bundle of light guides 4 on a detector 6. An antireflective layer is indicated by 24.

Gamma radiation now comes from the object 10, e.g. as a result of radioisotopes being used, and passes through an opening (pinhole) 22 in a wall 20. Since the wall 20 is substantially opaque to the gamma radiation, for example because it is made of lead, a beam 8 is provided as a cone fanning out from opening 22.

The beam 8 first passes through antireflective layer 24. Since this is substantially transparent to gamma radiation, the latter will pass through unhindered and arrive in scintillation crystal 2. There, scintillation causes optical radiation to be generated, some of which finds its way to the light guides 4. It should be noted that the bundle of light guides in this case points to one spot, substantially the opening 22. As a result, each gamma ray will generate, from the opening 22, scintillations in the smallest possible number of collection cones (not shown separately, but cf. FIG. 2). This will have a beneficial effect on the resolving power of the camera. For comparison, if a gamma ray is obliquely incident with respect to the axis of the light guides, said ray will intersect a plurality of adjoining collection cones, which means that scintillation radiation will arrive in a plurality of adjoining light guides 4. Whilst this effect can be reduced to some extent by means of weighting, the alignment of the light guides according to FIG. 3 will provide an optimal result in this case. Moreover, the use of non-aligned light guides of scintillation material would ensure that even the gamma ray would fall into a plurality of light guides and generate optical radiation therein, which will significantly impair the resolving power. Alignment of the light guides is therefore even more important if these too are fabricated from a scintillation material.

It should be noted that this is based on the assumption that the refractive indices, for the optical radiation, of the scintillation crystal 2 and of the material of the light guides 4 are substantially equal. If the refractive indices differ, refraction of the optical radiation at the interface between the two materials should be taken into account. Likewise, the direction of the end face of the light guide and its position with respect to the axis of the light guide should also be taken into account. If each end face is perpendicular to the axis of the light guide and to the gamma rays, in other words is directed towards opening 22, refraction need not be taken into account, given the vertical incidence of the optical radiation. If the end face is not perpendicular to the axis or not perpendicular to the gamma rays, a simple optical calculation should be performed in order to obtain the correct collection cone and consequently the corresponding alignment of the light guides.

The camera shown is of the emissive type, in which an image of the object to be examined is formed on the detector via a pinhole (or collimator). Usually, the object to be examined is itself the source of high-energy radiation, for example via the administration of radionuclides which are distributed in the object. The object will then radiate, from each part, in all directions. Each time, a fraction of the radiation will be able to pass the pinhole and thus form the image. This is an alternative to the transmission scintillation camera as shown, for example, in FIGS. 1 and 4, which does require a separate source of high-energy radiation.

It should be noted that as a result of the type of the light guides and light transport by virtue of total internal reflection, the alignment far away from the interface with the scintillation material is irrelevant. Furthermore, it is also possible, within certain limits, to achieve correct alignment of the collection cones with substantially parallel light guides by means of an advantageous choice, in each case, of the position of the end face of the light guide, utilizing the refraction at said end face. One condition in this last-mentioned situation is of course that a difference in refractive index exists between the material of the scintillation crystal 2 and the light guides 4.

The antireflective layer 24, which could also be called absorption layer, serves to absorb optical radiation incident thereon in the scintillation crystal 2 or to prevent it in some other way from returning in the direction of the light guides 4. As a result, the detected background signal will decrease, and the signal-to-noise ratio will be improved. In essence, any material can be used for this purpose which absorbs the generated optical radiation but is itself transparent to the high-energy radiation, for example pigmented plastics etc. The thickness of the layer 24 as shown is exaggerated, incidentally. For that matter, an optically retroreflective layer such as Scotchlite™ can be used as an alternative instead of layer 24. In a favourable case, the intensity of the detector improves by a factor of 2.

Figure 4B:
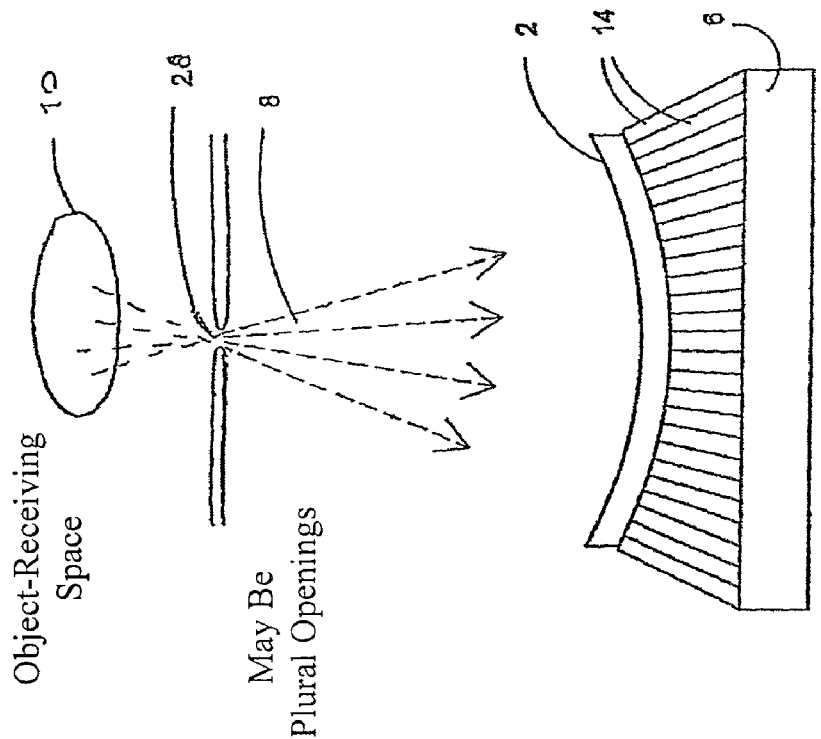
FIG. 4b an embodiment of a scintillation camera according to the invention.
Figure 4A:
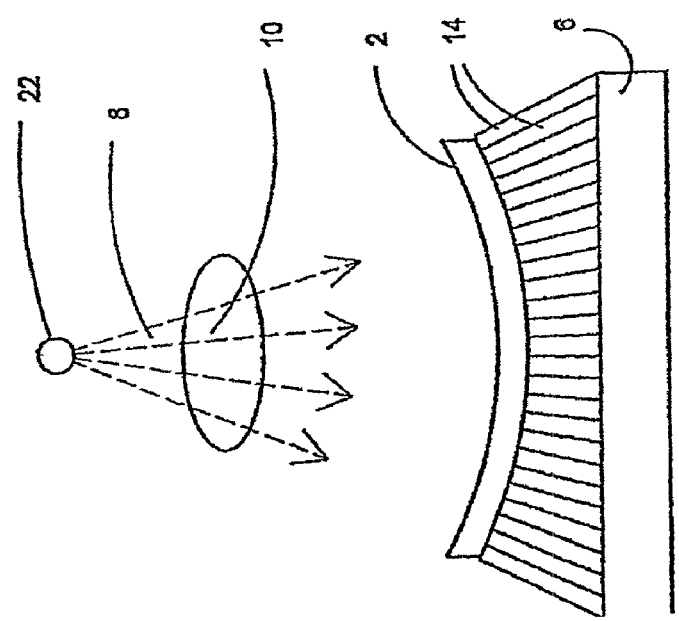
FIG. 4a shows an embodiment of a scintillation camera, in operation.

FIGS. 4a and b show a third and fourth embodiment of a scintillation camera according to the invention, in operation. Here, the light guides 4 in FIG. 4a point in a raywise manner towards the source 22 of high-energy radiation 8, a homogenous layer of scintillation material 2 being located on the end faces. This layer may have been deposited by being grown thereon or be attached separately after having been given the correct shape, for example by grinding or the like. In this arrangement, the scintillation material can, if required, be joined, for example, to the light guides 4 with the aid of an optical bonding medium such as cement having a suitable refractive index. The source 22 can be an X-ray tube, for example.

It should be noted that the bundle of light guides 4 fanning out in a raywise manner need no longer be aligned in such a way at some distance from the scintillation material. At a distance, for example, of several cross sections of the light guides, the bundle can alternatively continue in a parallel arrangement, to avoid unduly large dimensions of the bundle.

It is also to be noted that the alignments shown in FIGS. 3 and 4a relate to so-called convergent alignments, in which the point where the directions of the high-energy rays converge is situated in front of the camera. They form an enlarged image of the object 10.

Another convergent option, used far more often in practice, for FIG. 4b is an object 10 which is itself a source, for example by injection of radioisotopes, a pinhole 28 being used to form images. A convergent collimator is positioned close to or on scintillation material 2, the channels therethrough having an alignment which corresponds to that of the light guides 14. Both parts, collimator and light guides, then point to the virtual source (pinhole 28) of high-energy radiation.

Also existing are, for example, divergent collimators, which form a reduced image. In these collimators, the convergence point of the directions in which the high-energy rays propagate is situated behind the camera. Here, again, the light guides accord with the alignment of the channels through the collimator, the bundle 14 being divergent, in contrast. In general it is the case that the light guides 14, in terms of their alignment, agree with the alignment of the channels of the collimator.

Figure 5:
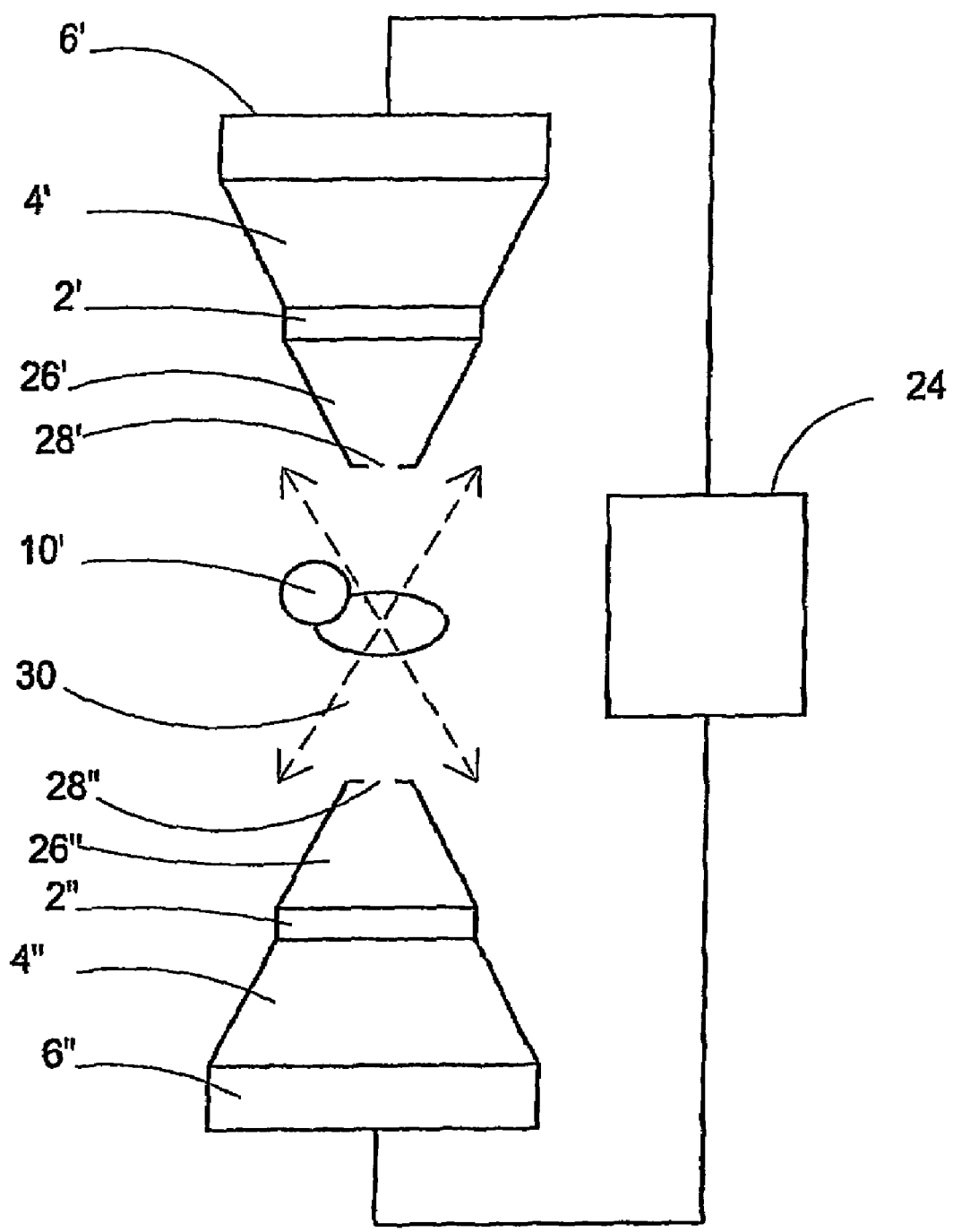
FIG. 5 shows a embodiment of a scintillation camera, in operation.

FIG. 5 shows a fifth embodiment of a scintillation camera according to the invention, in operation. This relates to a configuration involving two subcameras, each of them being emission scintillation cameras. The camera as a whole comprises two scintillation crystals 2' and 2", and two corresponding bundles of light guides 4' and 4" and two detectors 6' and 6", the latter being linked to a processing unit 24. Reference numerals 26' and 26" indicate two beam formers, each having an opening (pinhole) 28' and 28", respectively.

Reference numeral 10' indicates an experimental animal from which a beam of gamma radiation 30 emanates.

The system as shown in fact comprises two cameras according to the invention. This allows two views of the experimental animal to be detected simultaneously. The assumption here is that the source of the high-energy radiation in this case is a radioisotope distributed within the experimental animal. The pinhole camera is able to project an image of the distribution onto the detector via the pinhole, obviously via the scintillation material and the light guides.

Obviously, the position of the experimental animal 10' can be adjusted with respect to the camera, for example rotated in order to obtain further views. The number of cameras is obviously not limited to two but can in fact be any desired number, such as three, four or even several tens. Furthermore, the space between the cameras could be constructed as an enclosed chamber (not shown in this example) so as to define more closely the position of the animal 10'.

The beam formers 26' and 26" shown herein, with their pinholes 28' and 28", make the (two) cameras shown into pinhole cameras. This is again a typical example of an emission scintillation camera, an image being made of a source and imaging being performed by means of a pinhole. The pinhole is, as it were, the camera optics. The pinholes become virtual sources which appear to emit radiation, which does now, however, contain positional information from the original extended source.

The light guides and their end faces in the bundles 4' and 4" are directed in such a way that within the scintillation crystals 2' and 2" the collection cones of the light guides are directed towards the pinholes 28' and 28", respectively. If the material of the light guides and the scintillation material have matching refractive indices, it is sufficient for the ends of the light guides to be directed towards the pinholes.

Alternatively or complementarily, the (sub)cameras can also comprise a collimator which then have a series of openings in an opaque wall with corresponding transmission directions. The (collection cones of the) light guides can then each be in line with one of the transmission directions of the collimator.

The schematically depicted processing unit 24 can comprise, for example, a computer with image processing software, as well as, for example, a monitor for visual assessment of the detected images, a data storage device etc. The specific embodiments shown here are to be understood merely as a non-limiting explanation of the invention, whose scope is defined by the appended claims.

The invention claimed is:

1. A scintillation camera for examination of an object, said scintillation camera comprising:
   a wall positioned adjacent an object receiving space for receiving an object to be examined, said wall being of a material that blocks high-energy radiation having a wavelength of X-ray radiation or shorter, and said wall having an opening through which high-energy radiation from the object receiving space is able to pass,
   a monolithic scintillation crystal having an incident side and an opposed rear side, said monolithic scintillation crystal being positioned on a side of said wall facing away from the object receiving space and positioned such that high-energy radiation passing through said opening in said wall is incident on the incident side of said monolithic scintillation crystal, said monolithic scintillation crystal converting said high-energy radiation having a wavelength of X-ray radiation or shorter incident thereon into optical radiation,
   at least one bundle of non-scintillating optical fibres, each of said non-scintillating optical fibres having an end that is joined to said rear side of said monolithic scintillation crystal, wherein all said ends of said optical fibers are aligned so as to each point to said opening in said wall,
   at least one position-sensitive detector that detects the optical radiation emanating from the optical fibres.

2. A scintillation camera according to claim 1, wherein the incident side of the monolithic crystal is concave and the rear side of the monolithic crystal is convex.

3. A scintillation camera according to claim 2, wherein for each of said non-scintillating optical fibres having an end that is joined to said rear side of said monolithic scintillation crystal, said end of said optical fiber is perpendicular to said optical fibre.

4. A scintillation camera according to claim 1, wherein the optical fibres have a numerical aperture of at most 0.5.

5. A scintillation camera according to claim 1, wherein the monolithic scintillation crystal on the incident side is provided with an antireflective layer which is substantially transparent to the high-energy radiation but which prevents optical radiation from being reflected back into the scintillation crystal.

6. Scintillation camera according to claim 1, wherein the monolithic scintillation crystal on the incident side is provided with a retroreflective material.

7. A scintillation camera according to claim 1, further comprising a source of high-energy radiation.

8. A scintillation camera according to claim 1, wherein the opening is a pinhole.

9. Scintillation camera according to claim 1, comprising a plurality of detectors and a plurality of bundles of optical fibres, each bundle being associated with one of the plurality of detectors.

10. A scintillation camera for examination of an object, said scintillation camera comprising:
a wall positioned adjacent an object receiving space for receiving an object to be examined, said wall being of a material that blocks high-energy radiation having a wavelength of X-ray radiation or shorter, and said wall having an opening through which high-energy radiation from the object receiving space is able to pass and which shapes the radiation as a cone fanning out from the opening,
a monolithic scintillation crystal having an incident side and an opposed rear side, said monolithic scintillation crystal being positioned on a side of said wall facing away from the object receiving space and positioned such that high-energy radiation passing through said opening in said wall is incident on the incident side of said monolithic scintillation crystal, said monolithic scintillation crystal converting said high-energy radiation having a wavelength of X-ray radiation or shorter incident thereon into optical radiation,
at least one bundle of non-scintillating optical fibres, each of said non-scintillating optical fibres having an end that is joined to said rear side of said monolithic scintillation crystal, wherein all said ends of said optical fibers are aligned so as to each point to said opening in said wall,
at least one position-sensitive detector that detects the optical radiation emanating from the optical fibres.

11. A scintillation camera for examination of an object, said scintillation camera comprising:
a wall positioned adjacent an object receiving space for receiving an object to be examined, said wall being of a material that blocks high-energy radiation having a wavelength of X-ray radiation or shorter, and said wall having an opening through which high-energy radiation from the object receiving space is able to pass,
a monolithic scintillation crystal having an incident side and an opposed rear side, said monolithic scintillation crystal being positioned on a side of said wall facing away from the object receiving space and positioned such that high-energy radiation passing through said opening in said wall is incident on the incident side of said monolithic scintillation crystal, said monolithic scintillation crystal converting said high-energy radiation having a wavelength of X-ray radiation or shorter incident thereon into optical radiation,
at least one bundle of non-scintillating optical light guide fibres, each of said non-scintillating light guide optical fibres having an end that is joined to said rear side of said monolithic scintillation crystal, wherein each of the non-scintillating optical fibres has a collection cone of directions in the monolithic scintillation crystal from where optical radiation coming into said non-scintillating optical fibre is passed on by virtue of total internal reflection, and wherein the non-scintillating optical fibres are arranged in such a way that centre lines of the respective collection cones of the non-scintillating optical fibres converge in said opening in said wall,
at least one position-sensitive detector that detects the optical radiation emanating from the optical fibres.

* * * * *